Patented July 22, 1941

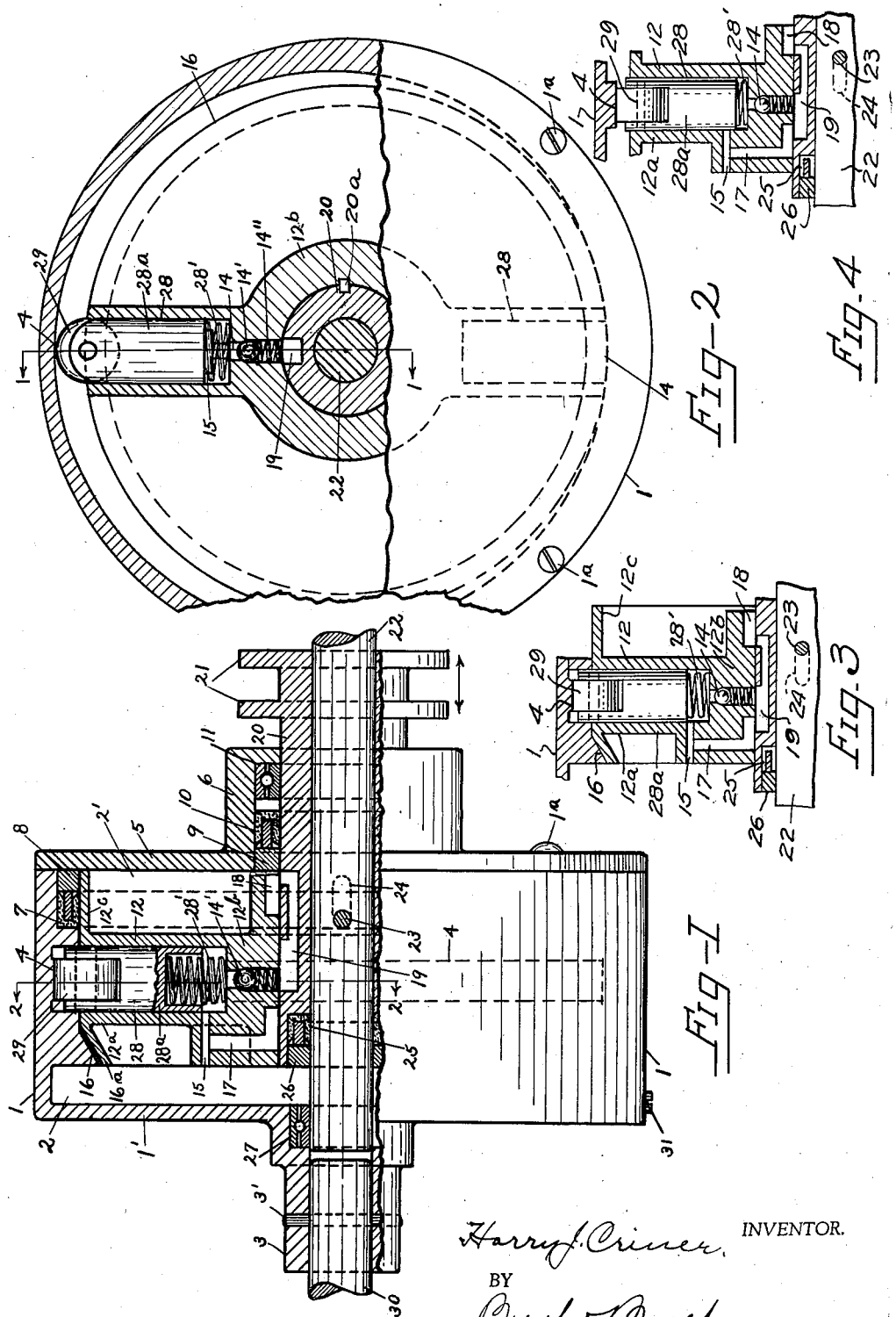

2,250,327

UNITED STATES PATENT OFFICE 2,250,327

FLUID OPERATED CLUTCH MECHANISM

Harry J. Criner, Davenport, Iowa, assignor of one-half to A. G. Bush, Davenport, Iowa Application October 24, 1940, Serial No. 362,550

14 Claims. (Cl. 192—85)

My invention relates to an improved fluid clutch mechanism for controlling the transmission of torque from a drive shaft to a driven shaft for engine driven vehicles and various other types of machinery to which it may be applicable.

The objects of my invention are to provide an improved form of clutch which may be easily engaged and disengaged either rapidly or gradually as desired and which may be caused to slip without material injury; to provide means by which the engaging pressure of the clutch may be varied to avoid jerking and sudden stoppage; to provide means by which the two members of a clutch may run in oil; to provide means by which the clutch may automatically return to engagement in case of fluid leakage from the fluid chamber thereof; to provide means by which the clutch may be easily controlled manually; and to provide power driven means to hold the clutch in engagement.

I attain these objects by the means illustrated in the accompanying drawing, in which—

Figure 1 is a side elevation partly in section on the lines 1—1 of Figure 2;

Figure 2 is a front elevation partly in section on the line 2—2 of Figure 1;

Figure 3 shows the slide valve in open position; and

Figure 4 shows the piston in locked position.

Similar numerals refer to similar parts throughout the several views.

My apparatus includes a cylindrical housing 1 which is rigidly united to the driven shaft 30 and contains an oil chamber 2. The housing 1 comprises a rear wall 1' with an annular sidewall formed integral therewith.

The sidewall has formed on the inner face thereof an annular eccentric cam track 4 and adjacent thereto at the rear the outer clutch member 16. The clutch is of a modified cone clutch type, the coacting faces of the clutch members being formed at an angle which will reduce or prevent grabbing but which will be sufficient to carry the full power or almost the full power of the drive shaft to the driven shaft without slipping. This angle cannot be a fixed angle to suit all cases, but will be varied in different types of machines where differently powered motors are employed and where different requirements exist as to slippage.

For general purposes, I prefer an angle of approximately 45° to the axis of the drive shaft.

A cylindrical piston comprising a front sidewall 12 and a rear sidewall 12a united by a hub 12b is mounted within the housing 1. The sidewall 12a is provided with a flange 16a which forms the inner member of the cone clutch and is formed at an angle corresponding to the outer clutch member 16. These clutch members may be of metal or other suitable material and may be faced with indurated fiber or other suitable facing as desired and one of them may be of steel and the other one of iron if desired.

The front sidewall 12 and rear sidewall 12a are preferably formed integral and combined with the hub composing a single solid head but are provided with one or more radial bores 28 in which plungers 28a are slidably mounted. These bores and plungers are preferably formed in pairs, the members of which are opposite each other or in threes or other odd numbers uniformly spaced to properly balance the piston so as to reduce vibration and may have balancers attached.

The front wall 12 of the piston is provided with an annular flange 12c which adjoins the inner face of the sidewall and may be provided with a packing ring 7 secured in place by a threaded screw ring 8.

The hub 12b is extended forwardly and rearwardly of the sidewalls 12 and 12a and has a large central bore in which a sleeve 20 is slidably mounted and keyed by key 20a, the sleeve 20 being coaxial with the drive shaft 22 which is mounted within the sleeve.

The sleeve 20 has a longitudinal slot 24 formed therein and a pin 23 secured in the drive shaft 22 has its ends extending into the slots 24 so that the sleeve 20 rotates in unison with the drive shaft 22. The inner end of the drive shaft 22 is mounted in a ball-bearing 27 secured in a suitable socket formed at the center of the rear wall 1' of the housing 1 for free revolution therein. The sleeve 20 is splined or keyed to the hub 14 and is freely slidable longitudinally therein.

A port 15 leads from the bore 28 to the oil chamber 2 and a radial port 17 is formed in the hub and connects with the port 15. A port 19 is formed in the sleeve 20 and when in one position the rear end of the port 19 registers with the port 18 which communicates with the front oil chamber 2'.

A coiled spring 28' is mounted in the bore 28 by which the plunger 28a is normally held outwardly from the hub.

A double collar 21 is formed upon the outer end of the sleeve 20 which may carry a yoke or fork by which the sleeve can be manually operated and caused to travel longitudinally of the drive shaft 22.

When the sleeve is moved in its open position the ports 15, 17, 19 and 18 form a free connection between the chambers 2 and 2' so that oil may pass freely from one to the other, but when the sleeve 20 is in the closed position shown in Figure 1, the port 17 will be closed and the rear end of the port 19 will connect with the port 14 leading from the bore 28 to the port 19. A check valve 14' may be mounted in the bore 14 held in place by a spring 14" which will check the flow of oil from the port 19 to the port 14.

The cam track 4 is eccentric as shown in Figure 2. The outer end of each plunger 28a has its sides extended to form a bearing for the pinion and a roller 29 which travels upon the cam track and by which the plunger will be forced to move inwardly during part of its revolution and the spring 26' will be free to move it outwardly during the remainder of its revolution.

A front wall 5 is rigidly secured to the front of the sidewall by set screws 1a or other suitable means and has a hub 6 projecting forwardly therefrom which carries a ball-bearing 11 in which the sleeve 20 rotates.

Additional packing rings may be provided held in place by threaded rings 9 and 26 if desired.

A plug 31 may be secured in a suitable opening formed in the housing 1 through which the housing may be filled with oil or other suitable fluid.

In the operation of my device the apparatus is set up as described with a very small clearance between the faces of the two members of the cone clutch. The oil chambers are then filled with oil and the sleeve 20 pushed into the open position where the ports 17, 19 and 18 register with each other. The engine is then started, and as the drive shaft 22 revolves, it carries with it the piston and the sleeve which may act as a flywheel therefor. When the desired speed has been attained, the sleeve is gradually returned to the position shown in Figure 1 by the operation of the manual control lever which is not shown.

As the piston travels around inside of the housing 1, the rollers 29 in contact with the cam track 4 cause the plunger 28a to move inwardly thereby pumping oil from the chamber 2 into the chamber 2' and as the oil passes into the chamber 2' it builds up a pressure upon the front wall 12 of the piston which forces the piston to the rear thereby bringing the faces of the two members of the cone clutch into contact and causing the housing 1 to revolve simultaneously with the piston. When it is desired to disengage the clutch, the sleeve 20 is manually moved in the opposite direction until the ports 17, 19 and 18 are opened and the oil will then pass from the chamber 2' to the chamber 2, thus equalizing the pressure on both sides of the piston and releasing the inner clutch member from forced contact with the outer clutch member.

When desired the cam track 4 and plunger 28a may be so proportioned that the plunger will close the port 15 and at the same time the port 14 be closed by the sleeve as in Figure 4. When so arranged, the plunger will be held against any further inward movement and the wheel 29 contacting the cam tract 4 will wedge against it and cause the track and housing 1 to revolve with the piston thus forming a clutch without the clutch members 16 and 16a being engaged.

Various modifications in the size, proportions and form of the various parts may be made without departing from the spirit of my invention and I do not limit my claims to the precise forms shown in the drawing.

I claim:

1. A clutch comprising a driven shaft with closed cylindrical housing united thereto carrying the outer member of a cone clutch, a drive shaft having a piston united thereto carrying the inner member of a cone clutch within the housing and slidable for a short distance longitudinally therein, said piston being rotatable in the housing when the clutch is disengaged and rotatable with the housing when the clutch is in engagement, the drive shaft being mounted upon suitable bearings concentric of the housing and piston, a sleeve mounted upon and slidable longitudinally of the drive shaft and rotatable therewith, the piston being keyed or splined upon the sleeve or otherwise suitably secured against rotation relative thereto, one or more radial bores formed in the piston with a plunger or plungers slidably mounted therein, each plunger bearing upon its outer end a bearing wheel or roller rotatably mounted, an eccentric grooved cam track in the inner face of the housing in which said wheel may travel as the piston rotates within the housing, said groove being slightly wider than said wheel, front and rear fluid chambers formed at the front and rear of the piston, a by-pass formed in the sleeve connecting with front and rear ports formed in the piston for passage of fluid from one chamber to the other, the port or ports from the rear chamber also opening into the aforesaid bore or bores, additional ports at the inner ends of the piston bores opening into the ports formed in the sleeves, check valves to close the last mentioned ports and means united to the sleeve whereby it may be manually moved longitudinally from the closed to the open position of the ports or vice versa.

2. A fluid clutch comprising a closed cylindrical housing carrying the outer member of a cone clutch, a rotatable piston carrying the inner member of said clutch mounted within the housing and slidable longitudinally therein, a driven shaft united to the housing, a drive shaft mounted concentric of the housing and piston and coaxial with the driven shaft, a sleeve mounted upon and slidable longitudinally of the drive shaft and rotatable therewith, the piston being secured against rotation relative to the sleeve, radial bores formed in the piston with plungers slidably mounted therein, said plungers carrying guide wheels rotatably mounted at the outer ends thereof respectively, an eccentric cam track formed in the inner face of the housing on which said wheels may travel when the piston rotates within and relative to the housing, front and rear fluid chambers in the housing at the front and rear of the piston, connecting ports formed in the piston and sleeve for passage of fluid to or from the bores and to or from either chamber to the other, check valves to close the bores, and means united to the sleeve whereby it may be manually moved from the closed to the open position of the ports.

3. A fluid-actuated clutch comprising a driven shaft with closed cylindrical housing united thereto carrying the outer member of a cone clutch, a drive shaft having a piston united thereto carrying the inner member of a cone clutch mounted within the housing and slidable for a short distance longitudinally therein, said piston being rotatable in the housing when the clutch is disengaged and rotatable therewith when the clutch is in engagement, a driven shaft mounted upon suitable bearings concentric of the housing and piston, a sleeve mounted upon and slidable longitudinally of the drive shaft and rotatable therewith, the piston being keyed or splined upon the sleeve or otherwise suitably secured against rotation relative thereto, one or more radial bores formed in the piston with plungers slidably mounted therein, each plunger bearing upon its outer end a guide wheel rotatably mounted therein, an eccentric cam track formed in the inner face of the housing on which said wheel may travel as the piston rotates within the housing, said track being wider than said wheel, front and rear fluid chambers formed at the front and rear of the piston, and means by which the fluid may be forcibly pumped by the plungers from the rear chamber to the front chamber whereby the pressure of the fluid in the front chamber will force the inner clutch member into operative contact with the outer clutch member.

4. A clutch as described in claim 3, and means by which the pressure of the fluid in the rear and front chambers will be equalized thereby releasing the clutch members from engagement.

5. A clutch as described in claim 3, and means by which the pressure of the fluid in the front chamber may be reduced thereby releasing the clutch members from engagement.

6. A clutch comprising an outer cylindrical closed housing bearing an annular cam track eccentrically positioned therein, an inner member comprising a cylindrical body concentrically mounted within the housing, one or more radial bores formed in said body, a plunger slidingly mounted in each of said bores, a bearing roll or wheel rotatably mounted in the outer end of each plunger adapted to contact and roll upon the cam track when the clutch is not engaged, and to carry the cam track and housing with it when engaged, a driven shaft united to the housing, a drive shaft rotatably mounted within the housing and concentric with the housing and the cylindrical body, a sleeve mounted upon the drive shaft slidable longitudinally thereof and rotatable therewith, said sleeve also being keyed to the cylindrical body so as to rotate therewith, a port separately connecting said fluid chamber to each of said bores at a point intermediate the inner and outer limits of travel of the plunger therein, and resilient means secured in the inner end of each bore exerting an outward pressure upon the piston therein.

7. A clutch comprising an outer cylindrical closed housing bearing an annular cam track eccentrically positioned therein, an inner member comprising a cylindrical body concentrically mounted within the housing, one or more radial bores formed in said body, a piston slidingly mounted in each of said bores, a bearing roll or wheel rotatably mounted in the outer end of each piston adapted to contact and roll upon the cam track when the clutch is not engaged, and to carry the cam track and housing with it when engaged, a driven shaft united to the housing, a drive shaft rotatably mounted within the housing and concentric with the housing and the cylindrical body, a sleeve mounted upon the drive shaft slidable longitudinally thereof and rotatable therewith, said sleeve also being keyed to the cylindrical body so as to rotate therewith, a port separately connecting said fluid chamber to each of said bores at a point intermediate the inner and outer limits of travel of the piston therein, resilient means secured in the inner end of each bore exerting an outward pressure upon the piston therein, and means in the sleeve to release the fluid in the inner end of the radial bore or bores when the sleeve is in a given adjusted position.

8. A clutch comprising an outer cylindrical closed housing bearing an annular cam track eccentrically positioned therein, an inner member comprising a cylindrical body concentrically mounted within the housing, one or more radial bores formed in said body, a piston slidingly mounted in each of said bores, a bearing roll or wheel rotatably mounted in the outer end of each piston adapted to contact and roll upon the cam track when the clutch is not engaged, and to carry the cam track and housing with it when engaged, a driven shaft united to the housing, a drive shaft rotatably mounted within the housing and concentric with the housing and the cylindrical body, a sleeve mounted upon the drive shaft slidable longitudinally thereof and rotatable therewith, said sleeve also being keyed to the cylindrical body so as to rotate therewith, a port separately connecting said fluid chamber to each of said bores at a point intermediate the inner and outer limits of travel of the piston therein, resilient means secured in the inner end of each bore exerting an outward pressure upon the piston therein, and means in the sleeve to release the fluid in the inner end of the radial bore or bores when the sleeve is in a given adjusted position and to prevent escape of fluid therefrom when in another adjusted position.

9. A clutch comprising an outer cylindrical closed housing bearing an annular cam track eccentrically positioned therein, an inner member comprising a cylindrical body concentrically mounted within the housing, one or more radial bores formed in said body, a piston slidingly mounted in each of said bores, a bearing roll or wheel rotatably mounted in the outer end of each piston adapted to contact and roll upon the cam track when the clutch is not engaged, and to carry the cam track and housing with it when engaged, a driven shaft united to the housing, a drive shaft rotatably mounted within the housing and concentric with the housing and the cylindrical body, a sleeve mounted upon the drive shaft slidable longitudinally thereof and rotatable therewith, said sleeve also being keyed to the cylindrical body so as to rotate therewith, a port separately connecting said fluid chamber to each of said bores at a point intermediate the inner and outer limits of travel of the piston therein, a spring secured in the inner end of each bore exerting an outward pressure upon the piston therein, and means in the sleeve to release the fluid in the inner end of the radial bore or bores when the sleeve is in a given adjusted position.

10. A clutch comprising an outer cylindrical closed housing bearing an annular cam track eccentrically positioned therein, an inner member comprising a cylindrical body concentrically mounted within the housing, one or more radial bores formed in said body, a piston slidingly mounted in each of said bores, a bearing roll or wheel rotatably mounted in the outer end of each piston adapted to contact and roll upon the cam track when the clutch is not engaged, and to carry the cam track and housing with it when engaged, a driven shaft united to the housing a drive shaft rotatably mounted within the housing and concentric with the housing and the cylindrical body, a sleeve mounted upon the drive shaft slidable longitudinally thereof and rotatable therewith, said sleeve also being keyed to the cylindrical body so as to rotate therewith, a port separately connecting said fluid chamber to each of said bores at a point intermediate the inner and outer limits of travel of the piston therein, resilient means secured in the inner end of each bore exerting an outward pressure upon the piston therein, and means in the sleeve to release the fluid in the inner end of the radial bore or bores when the sleeve is in a given adjusted position, said sleeve being manually adjustable to open or to close the ports.

11. A clutch comprising an outer cylindrical closed housing bearing an annular cam track eccentrically positioned therein, an inner member comprising a cylindrical body concentrically mounted within the housing, one or more radial bores formed in said body, a piston slidingly mounted in each of said bores, a bearing roll or wheel rotatably mounted in the outer end of each piston adapted to contact and roll upon the cam track when the clutch is not engaged, and to carry the cam track and housing with it when engaged, a driven shaft united to the housing a drive shaft rotatably mounted within the housing and concentric with the housing and the cylindrical body, a sleeve mounted upon the drive shaft slidable longitudinally thereof and rotatable therewith, said sleeve also being keyed to the cylindrical body so as to rotate therewith, a port separately connecting said fluid chamber to each of said bores at a point intermediate the inner and outer limits of travel of the piston therein, resilient means secured in the inner end of each bore exerting an outward pressure upon the piston therein, and means in the sleeve to release the fluid in the inner end of the radial bore or bores when the sleeve is in a given adjusted position, said sleeve being manually adjustable to open or to close the ports simultaneously.

12. A clutch mechanism as described in claim 2, said means united to the sleeve also being capable of adjustment to simultaneously close two or three of the ports as desired.

13. A clutch mechanism as described in claim 2, said means united to the sleeve also being capable of adjustment to simultaneously close two or three of the ports as desired and the ports from the rear fluid chamber to the bores being closable by the plungers at a given point in their inward movement.

14. A clutch comprising a driven shaft with closed cylindrical housing united thereto carrying the driven member of a clutch, a drive shaft having a piston united thereto carrying the driving member of a clutch within the housing and slidable for a short distance longitudinally therein, said piston being rotatable in the housing when the clutch is disengaged and rotatable with the housing when the clutch is in engagement, the drive shaft being mounted upon suitable bearings concentric of the housing and piston, a sleeve mounted upon and slidable longitudinally of the drive shaft and rotatable therewith, the piston being keyed or splined upon the sleeve or otherwise suitably secured against rotation relative thereto, one or more radial bores formed in the piston with a plunger or plungers slidably mounted therein, each plunger bearing upon its outer end a bearing wheel or roller rotatably mounted, an eccentric grooved cam track in the inner face of the housing in which said wheel may travel as the piston rotates within the housing, said groove being slightly wider than said wheel, front and rear fluid chambers formed at the front and rear of the piston, a by-pass formed in the sleeve connecting with front and rear ports formed in the piston for passage of fluid from one chamber to the other, the port or ports from the rear chamber also opening into the aforesaid bore or bores, additional ports at the inner ends of the piston bores opening into the ports formed in the sleeves, check valves to close the last mentioned ports and means united to the sleeve whereby it may be manually moved longitudinally from the closed to the open position of the ports or vice versa.

HARRY J. CRINER.